United States Patent [19]
Karnoff et al.

[11] Patent Number: 5,857,616
[45] Date of Patent: Jan. 12, 1999

[54] CONTROL FOR FOGGER USING PRESSURIZED AIR AND WATER

[75] Inventors: Robert S. Karnoff, Sandy Hook; Brian J. Early, Stratford; Albert R. Thierfelder, New Milford, all of Conn.

[73] Assignee: Cool Fog Systems, Inc., Trumbull, Conn.

[21] Appl. No.: 966,220

[22] Filed: Nov. 7, 1997

Related U.S. Application Data

[60] Provisional application No. 60/031,286 Nov. 12, 1996.

[51] Int. Cl.$^6$ .................................................. G05B 21/01
[52] U.S. Cl. ........................... 236/44 A; 62/171; 165/229
[58] Field of Search ..................... 62/171, 304; 165/229; 239/407, 413; 236/44 B, 91 C, 44 A

[56] References Cited

U.S. PATENT DOCUMENTS 2,255,639  9/1941  Annin ..................................... 236/44 B
4,540,118  9/1985  Lortie et al. .............................. 62/171

*Primary Examiner*—John M. Sollecito
*Attorney, Agent, or Firm*—St. Onge Steward Johnston & Reens LLC

[57] ABSTRACT

A system for regulating the amount of fog produced by foggers in a humidification system in which a control signal calling for a certain amount of humidification from foggers is used and wherein the foggers require pressurized air and water to produce fog for an air stream. The pressure differential between the air and water to the foggers is varied according to the amount of required humidification. The pressure differential may be regulated with a pneumatic device or with an electronic control.

6 Claims, 1 Drawing Sheet

CONTROL FOR FOGGER USING
PRESSURIZED AIR AND WATER

PRIOR APPLICATION

This application claims the benefit of the filing date of provisional patent application entitled Control For Fogger Using Pressurized Air and Water filed with the United States Patent and trademark Office on Nov. 12, 1996 bearing Ser. No. 60/031,286.

FIELD OF THE INVENTION

This invention relates to the humidification of spaces inside a building with the use of pressurized air and water. More specifically this invention relates to the control of foggers used in the humidification of such spaces.

BACKGROUND OF THE INVENTION

In U.S. Pat. No. 5,525,268 a standard control system for supplying humidification is described using foggers that require pressurized air and water. The air pressure is kept at a higher fixed differential pressure to that of the water pressure. The bias (the difference between the air and water pressures) is constant throughout the full modulation range of the water and air pressures as described in the U.S. Pat. No. 5,525,268, which is incorporated herein by reference thereto. The constant bias enables a precise control over the amount of fog produced by the fogger and thus the amount of humidification of a space. A constant bias signal, however, tends to limit the range of humidification modulation.

SUMMARY OF THE INVENTION

With a fogger control in accordance with the invention the range of modulation can be significantly expanded by enabling the bias to be varied as a function of the amount of humidification called for by a control. It is, therefore, an object of the invention to provide a control for a fogger, which requires pressurized air and water, so that the range of modulation of the fogger, is significantly enlarged.

This and other objects and advantages of the invention can be understood from the following detailed description of an embodiment of the invention as illustrated in the drawing.

DETAILED DESCRIPTION OF THE DRAWING

Figure 1:
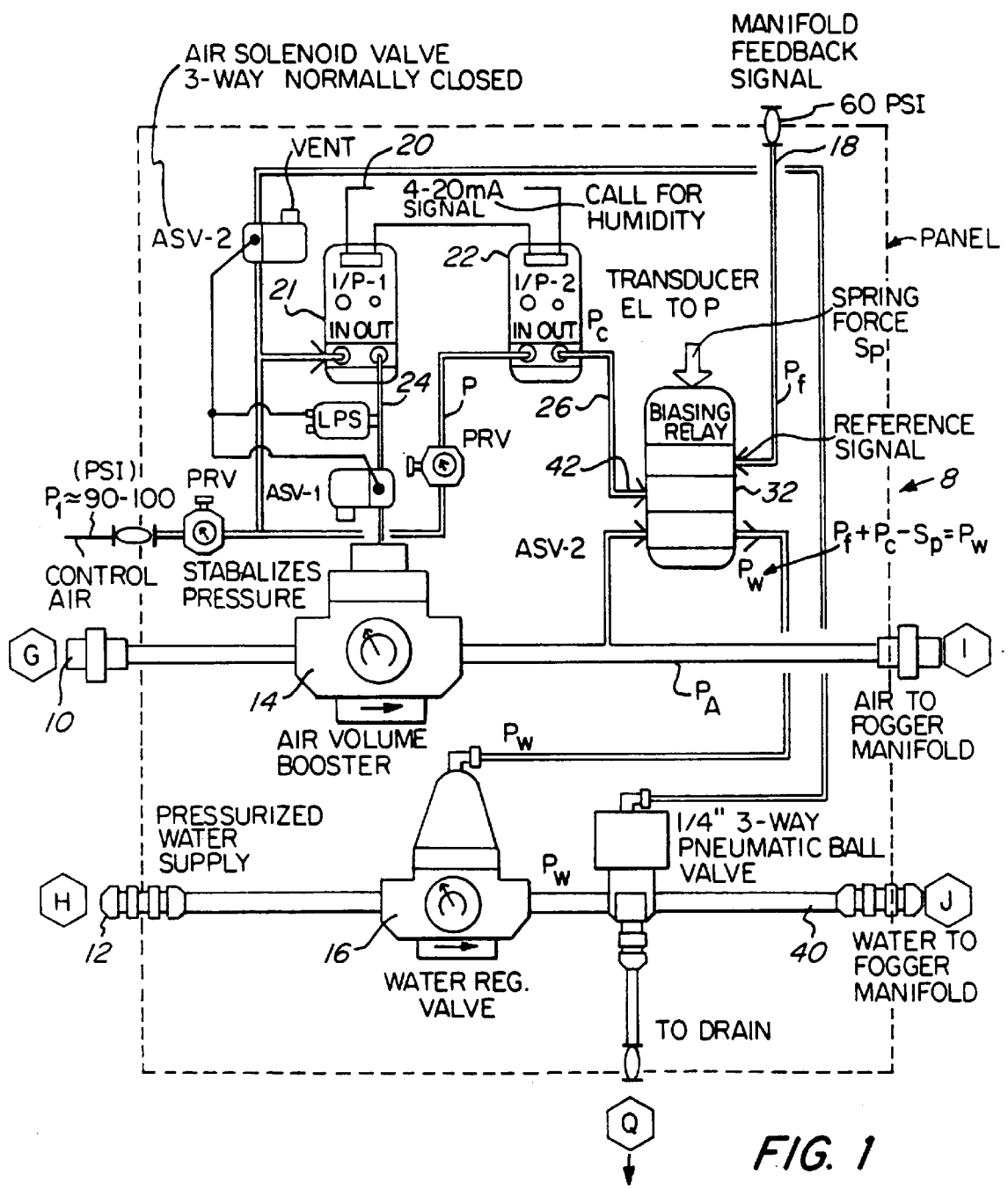
FIG. 1 is a diagrammatic view of a fogger control in accordance with the invention.

A new control 8 is illustrated in the attached FIG. 1 and is designed to produce fine fog over a wide range of modulation that includes both high and low percents of call. The percent of call is the input signal frequently applied to a humidification system by a building environment computer and is a current signal, for example in milliamperes, ma. The call signal sets a desired level of humidity in a range, typically from 4 to 20 ma, which represents a percent of the maximum humidity.

The new control 8 represents an improvement over the humidification control described in the above '268 patent in that it enables a wider range of modulation. This is achieved by varying a bias signal which in turn varies an otherwise constant pressure differential between the air and water pressures. The bias signal, which can be electrical or pneumatic, causes a higher pressure difference (where $P_a$, air pressure to the fogger, is greater than $P_w$, water pressure to the fogger, of for example 18 to 20 psi) at a low call level while at a high per cent of call, $P_a - P_w$ is changed to about 10 –12 psi.

Hence, as the percent of call changes, the new control changes the bias signal to result in a correspondingly different amount of fog being produced and thus achieving a finer control over humidification levels in a space at the extreme high and low ends.

The new control as shown in FIG. 1 comprises a supply of pressurized air 10 and a supply of pressurized water 12 each of which is applied to a pressure regulator 14, 16 respectively. A feedback line 18 provides a pneumatic feedback signal $P_w$ from the air manifold where the foggers, not shown, are mounted. A call signal arrives in electrical format on lines 20 to I/P transducers 21 and 22 each of which converts the electrical signal to a pressure on output lines 24 and 26 respectively. A control pressure is provided on a line 30 and is used to operate the various pneumatic components in FIG. 1.

The control incorporates a biasing relay 32 that adds two pneumatic signals $P_c$, the percent of call pressure signal, and $P_f$ the pneumatic feedback signal, and subtracts the sum of these from an adjustable bias $S_p$ produced by a spring 34 that is a part of the biasing relay 32. The result is a pilot signal $P_w$ that is equal to $P_f + P_c - S_c$ and is applied to the water regulating valve 16. As the control or call signal to the system is increased, the pneumatic output $P_c$ of the second transducer 22 is also increased. This results in a lower bias and thus $P_w$ as the control or call signal is increased.

With the panel switch, not shown, ON, the Cool Fog7 system 8 is ready to respond to a call for humidity on lines 20. A 4–20 mA control signal from the DDC, building environmental control system, is fed in series on line 20 to the two I/P transducers 21 and 22. The primary transducer 21 (I/P-1) generates a proportional pneumatic output signal required to modulate the air volume booster 14 (ASVB). When this pneumatic output signal reaches 25 psi, the low pressure switch (LPS) closes and energizes two air solenoid valves (ASV-1 and ASV-2). When energized, ASV-1 allows the primary transducer signal on pneumatic output line 24 to pilot the AVB 14.

When ASV-2 is energized, it allows the control air in line 30 to open the pneumatically-actuated ball valves on the water line 40. The AVB 14 is now supplying the foggers with compressed air at a pressure proportional the 4 –20 mA signal. This pressure $P_f$ is fed back along line 18 to the biasing relay 32. The secondary transducer's (I/P-2) pneumatic output signal $P_c$ on line 26 is simultaneously fed to an input 42 of the biasing relay. The biasing relay adds the two incoming pressure signals $P_f$ and $P_c$, subtracts a constant spring bias $S_p$ and produces the output signal $P_w$ required to modulate the water prv 16.

The control system 8 is adjusted so that with a 4 mA input signal, the secondary transducer output $P_c$ is zero psi, and the differential (the difference between the air and water pressures) is high (18 to 20 psi). A high differential creates a fine fog particle at a low percent of call. As the mA control signal is increased, the air pressure to the foggers is increased and the output of the secondary transducer is increased so that the differential is decreased. At high percents of call, the differential, i.e. $P_a - P_w$ is lowered (10 to 12 psi), which results in an increased fog production at the high call level.

Once the call level is such that the output signal on line 24 from the primary transducer 21 is modulated below 20 psi, the LPS opens and de-energizes the air solenoid valves. When ASV-2 is de-energized, the pneumatically actuated ball valves on the water lines 40 are instantly cycled into a drain down position. The control signal to the AVB 14 is bled slowly through a restricted opening in ASV-1. The restrictor causes the air to the foggers to stay on longer then the pressure to the water pressure regulator 16.

When the pressure difference between the air water, $P_a-P_w$, is kept at the same level while the system goes through its full range of call levels by jointly increasing the air and water pressures, the ratio of the lowest fog level produced to the highest fog level, the turn down ratio, is typically and reliably between 15 and 20 to one.

With the control system such as 8 it is possible to obtain a greater turn down ratio. For example, at a call level of about 7 ma the air and water pressures are reduced but with a pressure difference between them of $P_a-P_w$ of 14 psi. This produced about 10 pounds of fog per hour. At a high call of almost 20 ma at which the air and water pressures were increased but with a pressure difference of 9 psi, the system showed an ability to produce 465 pounds of fog per hour. This represents a turn down ratio of 46:1 over the operating range of humidity control system 8. Consistently higher ratios have been achieved.

The above-described control uses pneumatic and electrical devices. It should be understood that the invention contemplates the use of electronic controls or all pneumatic devices for establishing the desired regulation over the fog produced. For example the biasing relay 32 could be an analog or digital controller supplied with electrical signals representative of the desired difference signal $P_c$ as a function of the call signal on line 20, the feedback signal $P_f$, and the constant spring force $S_p$. The latter constant signal can be generated as a digital constant or in an analog circuit as a fixed voltage or current bias. The controller would in such case combine these signals in the manner as described.

What is claimed is:

1. In a control system for humidifying an airstream wherein foggers are used that need a supply of pressurized air and water kept at a predetermined pressure difference, and wherein a call signal represents a desired amount of fog to be produced by the foggers to humidify the air stream, and wherein a feedback signal is produced indicative of the pressure of the air at the foggers, the improvement comprising a device responsive to a call signal indicative of the desired fog output to produce a first control signal representative of a desired difference between the air and water pressures as a function of the call signal level;

a combining circuit responsive to the first control signal and the feedback signal to produce a signal indicative of a desired pressure difference between the air and water pressures as a function of the call signal level.

2. The improved control as claimed in claim 1 wherein the combining circuit includes a biasing element having a means for producing a constant bias signal indicative of a fixed pressure difference between the air and water leading to the foggers, first and second inputs respectively responsive to the feedback signal and said first control signal.

3. The improved control as claimed in claim 2 wherein said biasing element is a biasing relay having first and second pneumatic inputs respectively coupled to said feedback signal and said first control signal and wherein said constant bias signal producing means comprises a spring element.

4. A control system for humidifying an airstream wherein foggers are used that need a supply of pressurized air and water kept at a predetermined pressure difference, and wherein a call signal represents a desired amount of fog to be produced by the foggers to humidify the air stream, and wherein a feedback signal is produced indicative of the pressure of the air at the foggers, comprising:

means responsive to a call signal indicative of the desired fog output for producing a first control signal representative of a desired difference between the air and water pressures as a function of the call signal level;

means for combining the first control signal and the feedback signal for producing a pressure difference signal indicative of a desired produce the air and water pressures as a function of the call signal level; and means responsive to said pressure difference signal for regulating the water pressure applied to said foggers to said desired pressure difference below the air pressure to said foggers.

5. The control system as claimed in claim 4 wherein the combining means includes biasing means for producing a bias signal indicative of a fixed pressure difference between the air and water leading to the foggers, and means responsive to the feedback signal and said first control signal for altering said bias signal.

6. The improved control as claimed in claim 5 wherein said biasing means includes a biasing relay having first and second pneumatic inputs respectively coupled to said feedback signal and said first control signal and wherein said bias signal producing means comprises a spring element.

* * * * *